(12) United States Patent
Paris et al.

(10) Patent No.: US 8,787,659 B2
(45) Date of Patent: *Jul. 22, 2014

(54) AUTOMATIC ADAPTATION TO IMAGE PROCESSING PIPELINE

(71) Applicant: Adobe Systems Incorporated, San Jose, CA (US)

(72) Inventors: Sylvain P. Paris, Jamaica Plain, MA (US); Jen-Chan Chien, Saratoga, CA (US); Vladimir L. Bychkovsky, Cambridge, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,469

(22) Filed: Aug. 2, 2013

(65) Prior Publication Data

US 2013/0315479 A1 Nov. 28, 2013

Related U.S. Application Data

(63) Continuation of application No. 13/430,488, filed on Mar. 26, 2012.

(60) Provisional application No. 61/530,785, filed on Sep. 2, 2011.

(51) Int. Cl.
*G06K 9/62* (2006.01)
*G06T 1/20* (2006.01)
*G06K 9/00* (2006.01)
*G06F 17/30* (2006.01)

(52) U.S. Cl.
CPC ........ *G06K 9/6256* (2013.01); *G06F 17/30247* (2013.01); *G06T 1/20* (2013.01); *G06K 9/00624* (2013.01)
USPC ........................................................ 382/159

(58) Field of Classification Search
USPC ........................................................ 382/159
See application file for complete search history.

(56) References Cited

U.S. PATENT DOCUMENTS

| 4,975,970 | A | 12/1990 | Zettel et al. |
| 5,193,628 | A | 3/1993 | Hill, III et al. |
| 5,278,602 | A | 1/1994 | Honma et al. |
| 5,386,483 | A | 1/1995 | Shibazaki |
| 5,426,684 | A | 6/1995 | Gaborski et al. |
| 5,742,698 | A | 4/1998 | Minami et al. |
| 6,404,512 | B1 | 6/2002 | Tone |
| 6,473,084 | B1 | 10/2002 | Phillips et al. |
| 6,687,528 | B2 | 2/2004 | Gupta et al. |

(Continued)

OTHER PUBLICATIONS (Ahmad, Jakaria, "Image-Processing Pipeline for highest Quality Images", World Academy of Science, Engineering and Technology 35, 2009).*

(Continued)

*Primary Examiner* — Samir Ahmed
*Assistant Examiner* — Totam Le
(74) *Attorney, Agent, or Firm* — Wolfe-SBMC

(57) ABSTRACT

Techniques are disclosed relating to generating generic labels, translating generic labels to image pipeline-specific labels, and automatically adjusting images. In one embodiment, generic labels may be generated. Generic algorithm parameters may be generated based on training a regression algorithm with the generic labels. The generic labels may be translated to pipeline-specific labels, which may be usable to automatically adjust an image.

20 Claims, 8 Drawing Sheets

(56) References Cited

U.S. PATENT DOCUMENTS

| | | | |
|---|---|---|---|
| 6,718,193 B2 | 4/2004 | Knoplioch et al. | |
| 6,738,154 B1 | 5/2004 | Venable | |
| 6,798,536 B1 | 9/2004 | Muramoto | |
| 6,826,310 B2* | 11/2004 | Trifonov et al. | 382/274 |
| 7,120,303 B2 | 10/2006 | Mitchell et al. | |
| 7,174,049 B2 | 2/2007 | Bhattacharjya | |
| 7,191,106 B2 | 3/2007 | Minor et al. | |
| 7,286,131 B2 | 10/2007 | Brodie et al. | |
| 7,375,848 B2 | 5/2008 | Nakami et al. | |
| 7,409,151 B2 | 8/2008 | Kato et al. | |
| 7,719,574 B2 | 5/2010 | Nakami et al. | |
| 7,739,054 B2 | 6/2010 | Carrick et al. | |
| 7,817,817 B2 | 10/2010 | Wu et al. | |
| 7,821,570 B2 | 10/2010 | Gallagher et al. | |
| 8,120,569 B2* | 2/2012 | Jou et al. | 345/102 |
| 8,264,676 B2 | 9/2012 | Kanellopoulos et al. | |
| 8,666,148 B2 | 3/2014 | Paris et al. | |
| 2002/0027603 A1 | 3/2002 | Kuwata et al. | |
| 2002/0044293 A1 | 4/2002 | Fukasawa | |
| 2002/0140693 A1 | 10/2002 | Nakami et al. | |
| 2002/0140952 A1 | 10/2002 | Fukasawa | |
| 2003/0011622 A1 | 1/2003 | Yomdin et al. | |
| 2003/0035159 A1 | 2/2003 | Nakami | |
| 2003/0053095 A1 | 3/2003 | Nakami | |
| 2003/0053690 A1 | 3/2003 | Trifonov et al. | |
| 2003/0080985 A1 | 5/2003 | Kagawa et al. | |
| 2004/0125112 A1 | 7/2004 | James | |
| 2004/0190789 A1 | 9/2004 | Liu et al. | |
| 2005/0100242 A1 | 5/2005 | Trifonov et al. | |
| 2006/0143731 A1 | 6/2006 | Timmis et al. | |
| 2006/0244980 A1 | 11/2006 | Grace | |
| 2006/0292619 A1 | 12/2006 | Carrick et al. | |
| 2007/0086624 A1 | 4/2007 | Breed et al. | |
| 2007/0140578 A1* | 6/2007 | Okutsu | 382/254 |
| 2007/0237370 A1 | 10/2007 | Zhou et al. | |
| 2007/0247650 A1 | 10/2007 | Nakami | |
| 2007/0291048 A1 | 12/2007 | Kerofsky | |
| 2008/0025562 A1 | 1/2008 | Takemoto | |
| 2008/0025563 A1 | 1/2008 | Takemoto | |
| 2008/0025589 A1 | 1/2008 | Ma et al. | |
| 2008/0068328 A1 | 3/2008 | Jou et al. | |
| 2008/0069445 A1 | 3/2008 | Weber | |
| 2008/0075367 A1 | 3/2008 | Winn et al. | |
| 2008/0085044 A1 | 4/2008 | Zhou et al. | |
| 2008/0130964 A1 | 6/2008 | Zwirn et al. | |
| 2008/0137986 A1 | 6/2008 | Liu et al. | |
| 2008/0165247 A1 | 7/2008 | Beresford et al. | |
| 2008/0198396 A1 | 8/2008 | Nakami et al. | |
| 2008/0240605 A1 | 10/2008 | Enjuji | |
| 2008/0260274 A1 | 10/2008 | Winder et al. | |
| 2008/0285853 A1 | 11/2008 | Bressan | |
| 2009/0103806 A1 | 4/2009 | Nakami | |
| 2010/0053384 A1 | 3/2010 | Manabe | |
| 2010/0226547 A1 | 9/2010 | Criminisi et al. | |
| 2010/0265359 A1 | 10/2010 | Nakami et al. | |
| 2011/0123133 A1 | 5/2011 | Mohanty et al. | |
| 2011/0206280 A1 | 8/2011 | Lee | |
| 2011/0229019 A1* | 9/2011 | Batur et al. | 382/159 |
| 2011/0292246 A1 | 12/2011 | Brunner | |
| 2012/0057781 A1 | 3/2012 | Morovic et al. | |
| 2012/0207359 A1 | 8/2012 | Konukoglu et al. | |
| 2013/0121566 A1 | 5/2013 | Paris | |
| 2013/0129196 A1 | 5/2013 | Paris et al. | |
| 2013/0257883 A1* | 10/2013 | Krig et al. | 345/506 |
| 2013/0315476 A1 | 11/2013 | Paris | |
| 2013/0322739 A1 | 12/2013 | Paris | |
| 2014/0133744 | 5/2014 | Paris et al. | |

OTHER PUBLICATIONS

Non-Final Office Action, U.S. Appl. No. 13/036,245, (Mar. 29, 2013), 17 pages.

U.S. Appl. No. 13/036,245, filed Feb. 28, 2011, 46 pages.

Adams, "Book—The Negative: Exposure and Development Basic Photo 2", Morgan and Lester, (1948), All pages.

Adams, "Book—The Print: Contact Printing and Enlarging", Morgan and Lester, (1950), All pages.

Bae, Soonmin et al., "Two-Scale Tone Management for Photographic Look", *ACM Transactions on Graphics*, 25(3), *Proceedings of the ACM SIGGRAPH Conference*, (2006), 9 pages.

Dale, Kevin et al., "Image Restoration Using Online Photo Collections", *Proceedings of IEEE Conference on Computer Vision*, (Sep. 2009), 8 pages.

Datta, Ritendra et al., "Studying Aesthetics in Photographic Images Using a Computational Approach", *Proceedings of the European Conference on Computer Vision*, (2006), 14 pages.

Eisman, et al., "Book—Adobe Photoshop Restoration & Retouching", New Riders Press, ISBN: 0321316274, (2006), All pages.

Gehler, Peter V., et al., "Bayesian Color Constancy Revisited", *Proceedings of the Conference on Computer Vision and Pattern Recognition*, (2008), 8 pages.

Hastie, et al., "Book—The Elements of Statistical Learning: Data Mining, Inference, and Prediction", Springer-Verlag, ISBN: 0387848576, (2009), All pages.

Hertzmann, Aaron et al., "Image Analogies", *Proceedings of SIGGRAPH 2001*, (2001), 14 pages.

Kang, Sing B., et al., "Personalization of Image Enhancement", *Proceedings of the Conference on Computer Vision and Pattern Recognition*, (2010), 8 pages.

Krause, et al., "Near-Optimal Sensor Placements in Gaussian Processes: Theory, Efficient Algorithms and Empirical Studies", *The Journal of Machine Learning Research* vol. 9, (Jun. 1, 2008), pp. 235-284.

Luo, Yiwen et al., "Photo and Video Quality Evaluation: Focusing on the Subject", *Proceedings of the European Conference on Computer Vision*, (2008), 14 pages.

Margulis, "Book—Photoshop LAB Color: The Canyon Conundrum and Other Adventures in the Most Powerful Colorspace", Peachpit Press, ISBN: 0321356780, (2005), All pages.

Rasmussen, Carl E., "Gaussian Processes in Machine Learning", MIT Press, (2006), 9 pages.

Reinhard, et al., "Book—High Dynamic Range Imaging: Acquisition, Display, and Image-Based Lighting", *Morgan Kaufman Publishers*, (2010), All pages.

Tenenbaum, et al., "Separating Style and Content", *Proceedings of the Conference on Advances in Neural Information Processing Systems*, 1997, (Dec. 1996), 9 pages.

Non-Final Office Action, U.S. Appl. No. 13/958,486, (Sep. 24, 2013),17 pages.

"Notice of Allowance", U.S. Appl. No. 13/036,245, Oct. 15, 2013, 13 pages.

"Non-Final Office Action", U.S. Appl. No. 13/430,459, Oct. 11, 2013, 14 pages.

"Non-Final Office Action", U.S. Appl. No. 13/958,481, Oct. 11, 2013, 14 pages.

"Non-Final Office Action", U.S. Appl. No. 13/430,488, Oct. 21, 2013, 15 pages.

"Final Office Action", U.S. Appl. No. 13/430,459, Mar. 20, 2014, 18 pages.

"Final Office Action", U.S. Appl. No. 13/430,488, Mar. 12, 2014, 18 pages.

"Final Office Action", U.S. Appl. No. 13/958,481, Mar. 12, 2014, 16 pages.

"Final Office Action", U.S. Appl. No. 13/958,486, Apr. 25, 2014, 16 pages.

"Non-Final Office Action", U.S. Appl. No. 13/430,459, May 8, 2014, 22 pages.

"Non-Final Office Action", U.S. Appl. No. 13/430,488, May 7, 2014, 18 pages.

Zeng, "Color Characterization for Inkjet Copiers", Proc. SPIE 6807, Color Imaging XIII: Processing, Hardcopy, and Applications, 68070X, Jan. 28, 2008, 8 pages.

* cited by examiner

AUTOMATIC ADAPTATION TO IMAGE PROCESSING PIPELINE

PRIORITY INFORMATION

This application claims benefit of priority of U.S. patent application Ser. No. 13/430,488, filed Mar. 26, 2012, which claims benefit of priority of U.S. Provisional Application Ser. No. 61/530,785, entitled "Automatic Adaption to Image Processing Pipeline" filed Sep. 2, 2011, the content of each of which is incorporated by reference herein in its entirety.

BACKGROUND

1. Technical Field

This disclosure relates generally to image adjustment and, more specifically, to automatic image adjustments.

2. Description of the Related Art

Adjusting photographs is a tedious process that requires skill and time. The difference between a picture that comes straight from the camera and a carefully adjusted one can be dramatic just by balancing the tones and revealing the interplay of light. To adjust a photograph, photographers need to consider the image content and the tonal challenges it presents. Even adjusting contrast and tonal balance is challenging because it must take into account the photo subject and lighting conditions.

Decision factors in photograph adjusting are often subjective and cannot be directly embedded into algorithmic procedures. Some photo editing packages offer automatic adjustment, however, many offer a simple heuristic that fails to address more complex adjustments that depend upon scene characteristics such as low versus high key, scenes with backlighting, or other difficult lighting situations. Other packages may apply simple rules, such as fixing the black and white points of the image to the darkest and brightest pixels. Although this may work in simple cases, these approaches fail in more complex examples, in which a photographer would apply more sophisticated modifications. Because of the complexities inherent in photograph adjusting, rule-based automatic techniques for adjusting photographs often fail.

Moreover, different image processing tools may use different image processing pipelines. For example, one tool may apply image processing operations in gamma-corrected RGB color space while another may perform operations in LAB or CMYK color space. The effects of image processing operations performed in different color spaces may differ widely. Oftentimes, no close-form mapping exists between such operations. Further, image processing pipelines often differ not only in color spaces but in the details of image processing operations.

SUMMARY

This disclosure describes techniques and structures that facilitate generating generic labels, translating the generic labels into pipeline-specific labels, and automatically adjusting an image. In one embodiment, a plurality of image pairs may be received. Each image pair may include a first image and a corresponding adjusted image that is an adjusted version of the first image. A plurality of generic labels may be generated. Each generic label may relate one or more parameters of one of the first images to one or more parameters of the corresponding adjusted image of the image pair. A regression algorithm may be trained with the plurality of generic labels resulting in a plurality of generic algorithm parameters. The generic labels and generic algorithm parameters may be configured to be provided to an image processing pipeline. The image processing pipeline may be configured to translate the generic labels into pipeline-specific labels usable to automatically adjust a new image.

In one embodiment, a plurality of generic labels that relate one or more parameters of a first image to a corresponding adjusted image of an image pair may be received for each of a number of image pairs. A plurality of generic algorithm parameters may also be received. The generic algorithm parameters may be generated based on a regression algorithm being performed on the plurality of generic labels. The plurality of generic labels may be translated into a plurality of pipeline-specific labels. One or more parameters of a new image may be globally adjusted based on the plurality of pipeline-specific labels and the plurality of generic algorithm parameters.

Figure 1:
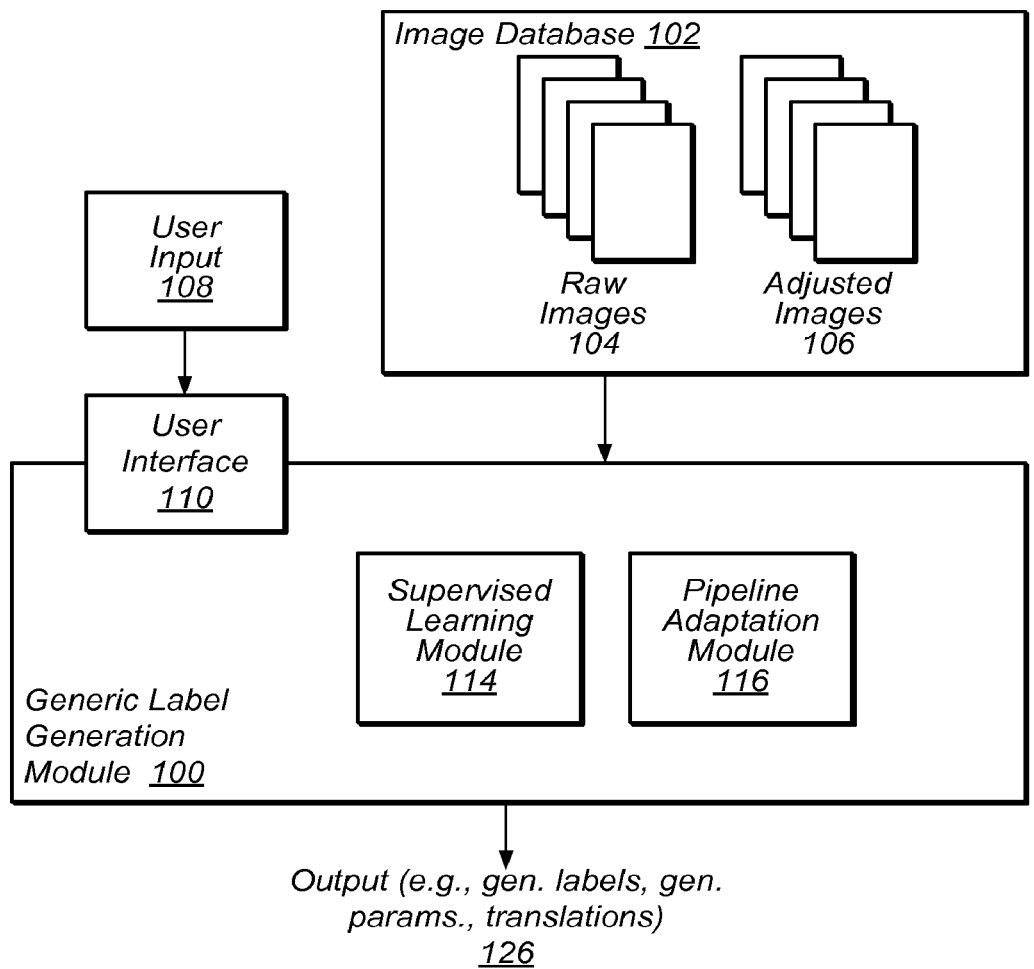
FIG. 1 illustrates an example module that may implement a generic label generation method, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, the terms "first" and "second" image processing pipelines can be used to refer to any two of multiple image processing pipelines. In other words, "first" and "second" image processing pipelines are not limited to logical image processing pipelines 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of automatic adaptation to an image processing pipeline are described. In embodiments, a number of first images (e.g., standard image, raw image, etc.) and corresponding adjusted images may be provided to a generic label generation module. The generic label generation module may relate one or more parameters of each first image to its corresponding adjusted image and generate generic labels that describe the adjustments. In some embodiments, the generic label generation module may train a regression algorithm to generate generic algorithm parameters. The generic labels may then be adapted to pipeline-specific labels so that various image processing pipelines may automatically adjust a new image.

Some embodiments may include a means for generating generic labels and/or generic algorithm parameters and/or a means for automatically globally adjusting a new image. For example, a supervised learning module may generate generic labels and generic algorithm parameters and/or a prediction module may receive generic labels and generic algorithm parameters to translate the generic labels to pipeline-specific labels and automatically adjust a new image, as described herein. The supervised learning module and/or prediction module may, in some embodiments, be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform generating generic labels and generic algorithm parameters or receiving generic labels and generic algorithm parameters and translating the generic labels to pipeline-specific labels and automatically adjusting a new image, respectively, as described herein. Other embodiments of the supervised learning module and/or prediction module may be at least partially implemented by hardware circuitry and/or firmware stored, for example, in a non-volatile memory.

Turning now to FIG. 1, generic label generation module 100 may implement one or more embodiments of generic label and generic algorithm parameter generation, as described herein. Not shown in FIG. 1, generic label generation module 100 may reside in an image processing pipeline (e.g., Adobe Photoshop, Adobe Lightroom, etc.), such as one of the image processing pipelines of FIG. 2. In the embodiment shown, generic label generation module 100 may receive image database 102, which may include image pairs of raw images 104 and corresponding adjusted images 106. Note that although the example of FIG. 1 illustrates raw images 104, other images (e.g., classical images, standard images, etc.) may also be used. Generic label generation module 100 may also receive user input 108 (via user interface 110) and may produce output 126, which may include generic labels, generic parameters, and translations to a number of image processing pipelines. Output 126 may be stored in memory (not shown) and/or may be used by an image processing pipeline, such as image processing pipeline 230 of FIG. 2, to automatically adjust a new image.

In one embodiment, image database 102 may include a plurality of photographs. As one non-limiting example, image database 102 may include 5000 raw images 104, which may be the original RAW format images straight from the camera (e.g., all the information recorded by the camera sensor is available) and may also include adjusted versions of the RAW images, adjusted images 106. As noted above, in some embodiments, raw images 104 may not be RAW format but may be standard images. The images may cover a variety of scenes, subjects, and lighting conditions. For example, the dataset of raw images 102 may include difficult cases such as images with back-lighting and foggy scenes. In one embodiment, the image resolution of raw images 102 may range from 6 to 21 megapixels. The dataset may contain photos from a variety of different cameras and lenses. Raw images 102 may include images taken using automatic exposure and may also include images taken in which the exposure was manually set. In one embodiment, image database 102 may include multiple sets of adjusted images 106. For example, image database 102 may include five sets of 5000 adjusted images 106 that correspond to the 5000 raw images 104. In this example, an image pair may be a raw image 104 and one of the corresponding adjusted images 106 from any of the five sets. One example of a type of adjustment made to raw images 104 that may be reflected in adjusted images 106 includes tonal adjustments.

Figure 7A:
FIGS. 7A-7F show an example of a raw image and examples of corresponding adjusted images.
Figure 7B:
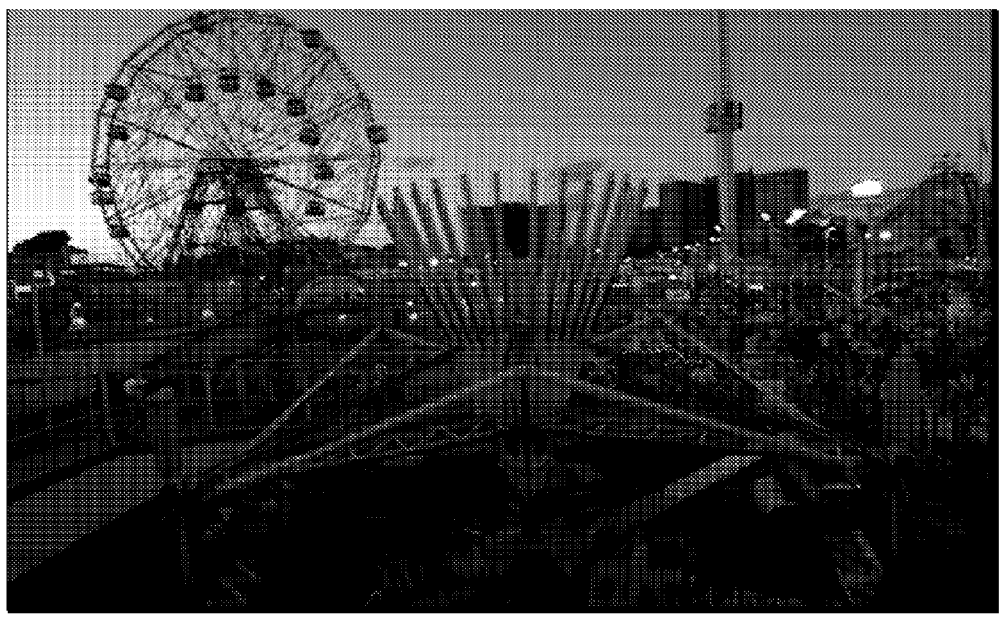
Figure 7C:
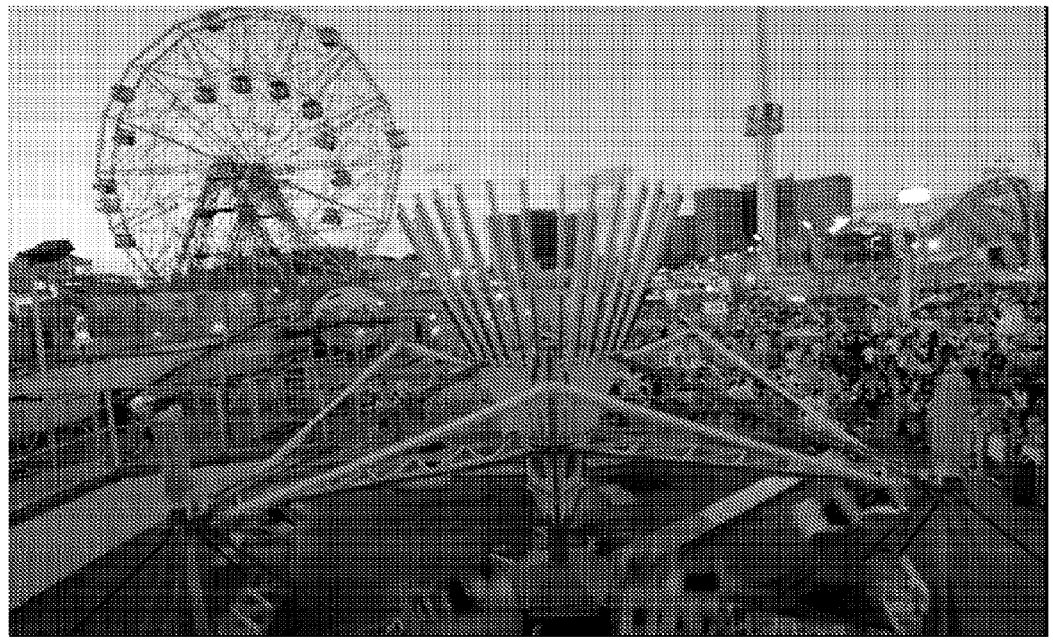
Figure 7D:
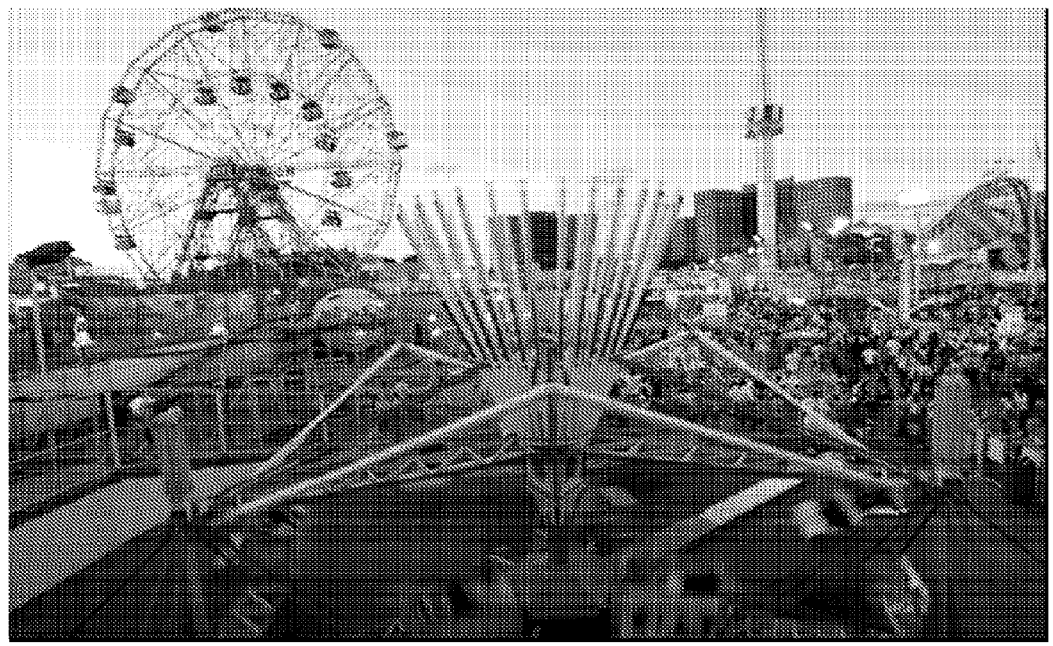
Figure 7E:
Figure 7F:

Adjusted images 106 may be the result of adjusting raw images 104 with image editing or retouching software corresponding to an image processing pipeline. For instance, an image processing pipeline may provide an interface composed of several sliders and a tone curve to perform adjustments, such as brightness, contrast, exposure, and black level. Other image processing pipelines may include different sliders or adjustment tools. Moreover, one image processing pipeline may have been used to retouch some of the adjusted images 106 while one or more other image processing pipelines may have been used to retouch other adjusted images 106. In many example image processing pipelines, similar sliders may exist but affect an image parameter in different ways. For example, two different image processing pipelines may include brightness controls but may be implemented differently and affect brightness differently. In one embodiment, adjusted images 106 may be adjusted using sliders of an image processing pipeline that correspond to a global remapping of pixel values. As one example, the sliders of an example image processing pipeline may include fourteen controls for the tone curve and two controls for the white balance. In addition, adjusted images 106 may also include adjustments made by using a slider that selectively brightens shadow regions of an image. An example of a raw image 104 and corresponding adjusted images 106 are shown in FIGS. 7A-F. An example raw image 104 is shown in FIG. 7A and five corresponding adjusted images 106 are shown in FIGS. 7B through 7F. In the example shown in FIGS. 7A-F, five retouchers have produced diverse adjusted versions from a sunset mood (FIG. 7B) to a daylight look (FIG. 7F).

Figure 5A:
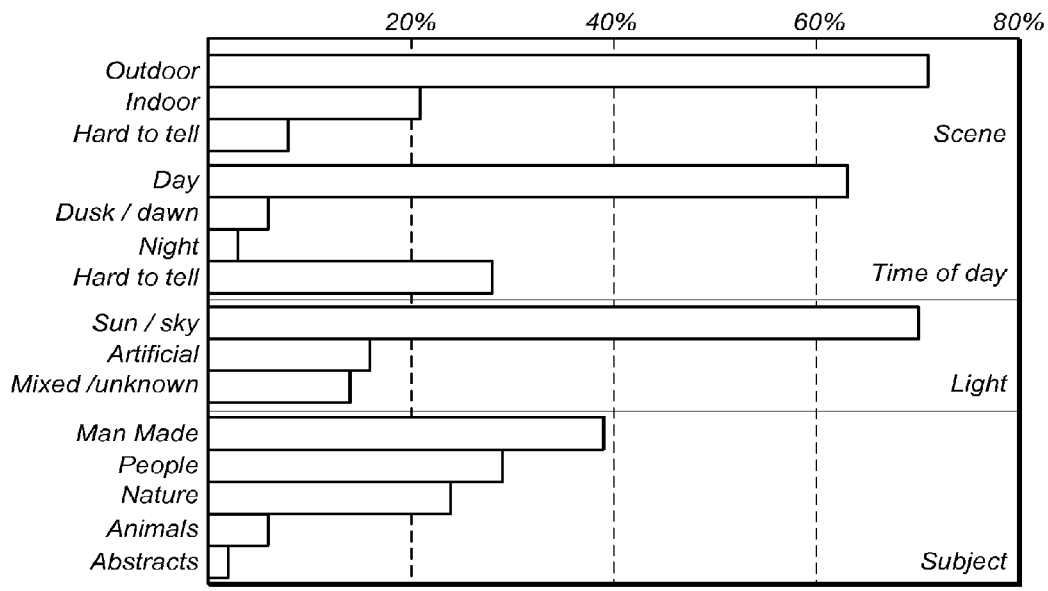
FIG. 5A illustrates an example categorization of an image database that may be used in various embodiments.
Figure 5B:
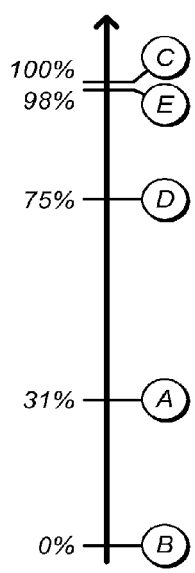
FIG. 5B illustrates a sample ranking of adjusted images that may be used in various embodiments.

One example of a categorization of image database 102, which may be used in various embodiments, is illustrated in FIG. 5A. In one embodiment, a tool (electronic, human, or otherwise) may be used to assign categories to the images. In the illustrated example, each photo has been categorized according to the following categories: scene, time of day, light, and subject. Each category may also include multiple subcategories (e.g., day, dusk, dawn, night, hard to tell for "time of day"). Other image databases 102 may include a different categorical breakdown of images. FIG. 5B illustrates a sample ranking of sets of corresponding adjusted images of one or more raw images 104 that may be used in various embodiments. 100% may correspond to a more favorable set of adjusted images while 0% may correspond to a less favorable set. For example, the photographs of FIGS. 7B-7F may each be one adjusted image in different sets of adjusted images (e.g., the photograph of FIG. 7B belongs to a set A of retoucher A, the photograph of FIG. 7C belongs to a set B of retoucher B, etc.). The sets of adjusted images are represented in FIG. 5B by A-E and may correspond to a collection of images adjusted by a single retoucher or group of retouchers. The sets A-E, may fall somewhere on a ranking scale. As shown in FIG. 5B, sets that include adjusted images shown in FIGS. 7D and 7F (sets/retouchers C and E) may belong to sets with a more favorable retouching than the set that the adjusted image of FIG. 7C belongs to (set/retoucher B).

Referring back to FIG. 1, in various embodiments, image database 102 may be included as part of generic label generation module 100 and/or an image processing pipeline and not as a stand alone database. In some cases, multiple image databases 102 may be present. Example databases may include a black and white database or an HDR database.

Image database 102 may allow generic label generation module 100 to learn generic global adjustments, such as global tonal adjustments, via supervised learning as opposed to techniques that train only from adjusted images. In one embodiment, image database 102 may allow transferred adjustment module 220 to learn image adjustment preferences of a new user from adjustments made to a small set of images, as described below at FIG. 2. In various embodiments, image database 102 may allow difference learning module 222 to predict a difference in image adjustment preference for a new user, also described at FIG. 2.

In one embodiment, generic label generation module 100 may receive user input 108 via user interface 110. User interface 110 may include a keyboard, touch screen device, microphone, or pointing device (e.g., mouse, trackball, stylus, or other similar devices). In one embodiment, user input 108 may include adjustments made with sliders and/or other controls that correspond to globally adjusting pixel values. User input 108 may include other types of adjustments as well. Adjustments made by user input 108 may be to images of image database 102 or to other images.

In one embodiment, generic label generation module 100 may include supervised learning module 114. Supervised learning module 114 may learn adjustments made by a photographer via machine-based learning given a collection of image pairs that may include raw images 102 and adjusted images 106. In one embodiment, adjustments to an image may be represented by generic labels (e.g., values, parameters, tone curves, color transformations, other transformations, etc.). A generic label may be a set of numbers that may be used to map to another set of numbers (e.g., pipeline-specific label) in a specific image processing pipeline 230. The generic labels and pipeline-specific labels may be multi-dimensional. For example, a generic label may be a value represented by three different generic sliders whereas in one specific pipeline, the pipeline-specific label may be represented by four different pipeline-specific sliders. In such an example, the generic label and pipeline-specific label differ in dimensionality (three versus four dimensions). The adjustments may be decomposed by using a look-up table, for example, and through principal component analysis (PCA), generic labels may be generated. The decomposition and PCA process may enable supervised learning module 114, or some other component, to determine generic labels (e.g. sliders) that are not specific to any one particular image processing pipeline. Instead, the generic labels may be specific to the image database 102.

For ease of explanation, the determination of generic labels and the algorithmic regression of the generic labels into generic algorithm parameters are described in terms of a particular image processing pipeline and tone curves; however, as described herein, adjustments to an image may be represented by generic labels and are not limited to tone curves. In one embodiment, labels originally determined in a particular pipeline may be referred to as the generic labels, as a point of reference to other pipeline-specific labels. In one embodiment, adjustments to an image may be represented as a remapping curve from input luminance to output luminance, using the CIE-Lab color space for its reasonably perceptual uniformity. If the image data is RGB data, it may be converted to the luminance color space and the curve may be determined by comparing the original image data to adjusted image data. The curve, or generic label, may be global such that every pixel is treated the same way. In one embodiment, each remapping curve, or generic label, may be represented by a spline with 51 uniformly sampled control points. The spline may be fit to pairs of input-output luminance values in a least-squares sense. Focusing on a select number of control points may allow for a more compact representation of adjustments that may include millions of inputs and outputs. In one embodiment, the exposure may be normalized to the same baseline by linearly remapping the luminance values of each image such that the minimum luminance value may be 0 and the maximum may be 100. In one embodiment, each learning curve may be approximated by using the first principal component analysis (PCA) coefficient. This may allow each curve, or generic label, to be summarized with a single number.

In various embodiments, features of the images included in the remapping curves (and spline), or generic labels, may be represented by descriptors. Descriptors may be computed using various techniques. The features used in supervised learning module 114 may range from low level descriptions of luminance distribution to high-level aspects such as face detection. Features may include intensity distributions, scene brightness, equalization curves, detail-weighted equalization curves, highlight clipping, spatial distributions, and faces. In one embodiment, before computing features, the images may be resized such that their long edge is 500 pixels.

In one embodiment, supervised learning module 114 may use the feature of intensity distributions. Photographers may rely on the distribution of intensities as depicted by a log-scale histogram to adjust the tonal balance. The mean of the distribution of the log-intensity log(R+G+B) may be computed with its percentiles sampled every 2%. Further, the same percentiles may be evaluated on two Gaussian-convoluted versions of the photo ($\sigma=10$ and $\sigma=30$) to account for tonal distributions at larger scales. In one embodiment, the image may be blurred and percentiles may be computed a second time to simulate as if one was looking at the image from farther away.

In one embodiment, supervised learning module 114 may use the feature of scene brightness. Dark and bright scenes may be adjusted differently. Accordingly, scene brightness may be evaluated with $(\hat{Y} \times N^2)/(\Delta t \times ISO)$, where $\hat{Y}$ is the median intensity, N is the lens aperture number that is inversely proportional to the aperture radius, $\Delta t$ is the exposure duration, and ISO is the sensor gain. Settings from the camera such as the lens aperture number may be obtained from image metadata. Scene brightness may be proportional to the light power reaching the camera sensor and may assume that no filter is attached.

Supervised learning module 114 may also use equalization curves. Histogram equalization may allow a coarse approximation of the entire available intensity range. In one embodiment, the cumulative distribution function (CDF) of the image intensities may be computed for each image and projected onto the first five PCA components.

In one embodiment, supervised learning module 114 may use the feature of detail-weighted equalization curves. Detailed regions of images may receive more attention. As a result, supervised learning module 114 may use this feature. Detail-weighted equalization curves may be represented by weighting each pixel by the gradient magnitude, and then computing the first five PCA coefficients of the CDF. The gradients may be estimated with Gaussian derivatives for $\sigma=1$, $\sigma=100$, and $\sigma=200$. This may account for details at different scales.

In one embodiment, supervised learning module 114 may use the feature of highlight clipping. Highlight clipping may measure the amount of highlight that gets clipped. The label values that clip 1%, 2%, 3%, 5%, 10%, and 15% of the image may be computed.

In one embodiment, supervised learning module 114 may use the feature of spatial distributions. This may include the fraction of highlights, midtones, and shadows and how a given tone range is spatially distributed. The intensity range may be split into 10 intervals. For each interval, a 2D spatial Gaussian may be fit to the corresponding pixels. The feature value may be the area of the fitted Gaussian divided by the number of pixels. The xy coordinates of the center of the Gaussian may also be used as a feature that represents the coarse spatial distribution of tones.

Supervised learning module 114 may use the feature of faces in various embodiments. Faces may be a main subject of photographs and the adjustment of faces may be a priority over other content. Further, face adjustment may follow different guidelines than other content. Faces may be detected and the following features may be computed: intensity percentiles within facial regions (if none, the percentiles of the whole image may be used), total area, mean xy location, and number of faces). Any type of face detector may be used. In various embodiments, supervised learning module 114 may use other features such as local histograms, color distributions, and scene descriptors.

By describing the images in terms of features, supervised learning module 114 may use the features to learn how adjustments are made to images, without regard to individual pixels. In one embodiment, the computed features may include 266 numbers for each image.

The computed features may be processed to generate generic algorithm parameters. In one embodiment, supervised learning module 114, given image database 102, may learn to adjust images similarly to the adjustments of adjusted images 106. In one embodiment, supervised learning module 114 may learn global tonal adjustment, which may not include hue, saturation, color, vibrance, or white balance changes, such that the luminance of an input pixel applied to a generic label may give the luminance of the output pixel. For example, adjustments to the luminance channel may include changes to aspects including: black points, highlights, shadows, contrast, brightness and exposure. The data from the generic labels may be processed by a regression algorithm, such as linear regression, least-squares regression (LSR), least absolute shrinkage and selection operator (LASSO) regression, or Gaussian Processes Regression (GPR). In one embodiment, LASSO may perform a linear regression on a sparse subset of the input dimensions and the algorithm may be trained using 5-fold cross-validation on the training set. Using a regression algorithm may allow supervised learning module 114 to describe image adjustments with a single number. Using a regression algorithm to describe image adjustments may be referred to as training the algorithm. Image adjustments may be described for the entire image database 102 or for a subset of the images, or training set. The result of the regression algorithm may be a generic formula or generic algorithm parameters (e.g., learning parameters) that may be adapted to various image processing pipelines. Within each image processing pipeline, the generic algorithm parameters and/or generic labels may be used to predict and make image adjustments to new images, as described herein. In one embodiment, the analysis performed by the regression algorithm on the descriptor vectors may result in a first PCA number for the generic labels corresponding to each image.

In some embodiments, generic label generation module 100 may include pipeline adaptation module 116. Pipeline adaptation module 116 may determine the capabilities of one or more image processing pipelines, and then determine a translation, or transformation, from generic labels to pipeline-specific labels (or other pipeline-specific adjustment parameters). The translation may be a multiplier, a relative difference, a matrix, or other translation that may be used to translate the generic labels. For example, let the generic label be a tone curve. A given image processing pipeline may not use a tone curve but instead may use a curve for each of multiple independent color channels. As a result, in one embodiment, pipeline adaptation module 116 may determine a translation, or transformation, to apply to the generic tone curve to generate a tone curve for each independent color channel. Then, given generic labels, generic algorithm parameters, and a translation, a prediction algorithm within the pipeline may be applied to perform automatic adjustment. For instance, a prediction algorithm may generate pipeline-specific labels based on translating the generic labels from the translation. Given the pipeline-specific labels and generic algorithm parameters, a new image may be automatically adjusted.

In one embodiment, pipeline adaptation module 116 may produce a single data structure (e.g., a modular data structure that is not shown in FIG. 1) that includes generic labels, generic algorithm parameters, and translations for each of a number of pipelines. The data structure may be processed by one of the image processing pipelines, which may cause the generic labels to be translated into pipeline-specific labels. In some embodiments, the data structure may also include pipeline-specific labels, in addition to, or instead of the generic labels and translations. In such an embodiment, translation into the pipeline-specific labels may occur in pipeline adaptation module 116, or in another component of generic label generation module 100. In one embodiment, the modular data structure may be used across different image processing products (e.g., different versions of various desktop or mobile platforms). To accommodate computationally underpowered devices (e.g., mobile devices), generic labels and/or generic algorithm parameters may be stored in the data structure at different degrees of fidelity.

In one embodiment, for each pair of images, an approximation to a transformation may be derived. Such transformations may replace generic labels with pipeline-specific labels during prediction, while learning algorithm parameters may be based on the generic, pipeline-independent labels. For example, if the only difference between the generic pipeline and specific pipeline is the color space, the generic labels may be multiplied by a matrix to get pipeline-specific labels. In another embodiment, generic labels may be directly transformed according to the difference between the generic and specific pipeline. For example, if a given pipeline differs from the generic pipeline only in the gamma value, it is possible to directly transform tone curves derived for the generic pipeline to the curves for the specific pipeline.

Figure 2:
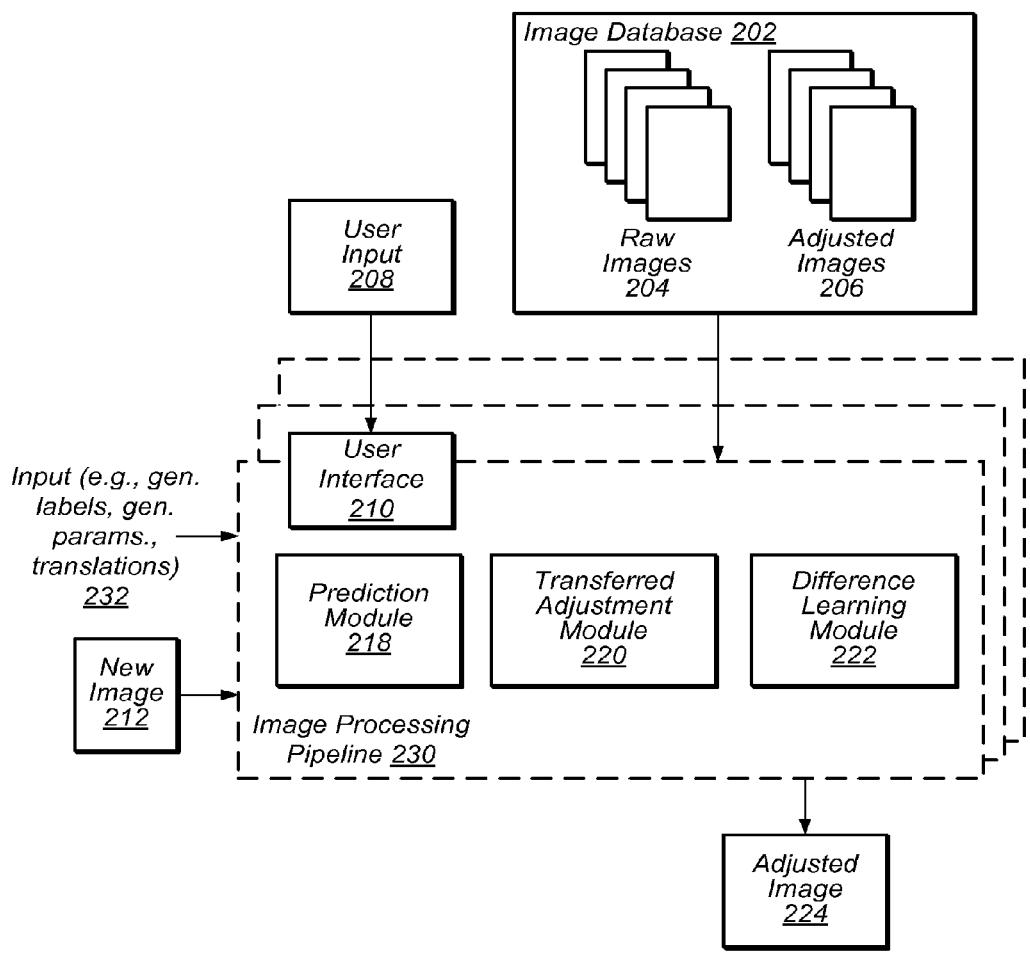
FIG. 2 illustrates an example module that may implement an automatic image adjustment method, according to some embodiments.

Turning now to FIG. 2, image processing pipeline 230 may implement one or more embodiments of pipeline-specific label adaptation and automatic image adjustment, as described herein. In the embodiment shown, image processing pipeline 230 may receive image database 202, which may include image pairs of raw images 204 and corresponding adjusted images 206. Image processing pipeline 230 may also receive user input 208 (via user interface 210), input 232 (e.g., generic labels, generic parameters, and translations to a number of image processing pipelines), and new image 212. Image processing pipeline 230 may produce adjusted image 234. Image processing pipeline 230 may translate at least a portion of input 232 (e.g., the generic labels) to pipeline-specific labels and automatically adjust new image 212 based on the pipeline-specific labels and the generic algorithm parameters to produce adjusted image 224.

In one embodiment, image processing pipeline may receive user input 208 via user interface 210. User interface 210 may include a keyboard, touch screen device, microphone, or pointing device (e.g., mouse, trackball, stylus, or other similar devices). In one embodiment, user input 208 may include adjustments made with sliders and/or other controls that correspond to globally adjusting pixel values. Such adjustments may be used in an embodiment using transferred adjustment module 220 and/or difference learning module 222. Adjustments made by user input 208 may be to images of image database 202 or to other images. User input 208 may include other types of input as well.

Image processing pipeline 230 may receive input 232, which may include generic labels, generic algorithm parameters, and translations, such as those generated by generic label generation module 100. Note that the generic labels, generic algorithm parameters, and translations may not be directly received from another image processing pipeline or generic label generation module 100. For example, output 126 of FIG. 1 may be stored as a file in memory. Such a file may be loaded into image processing pipeline 230 as input 232, for example, via user input 208. In various embodiments, the generic labels may be translated into pipeline-specific labels by prediction module 218, based on the translation that corresponds to the particular image processing pipeline 230 that received input 232. In other embodiments, translation into pipeline-specific labels may be performed by generic label generation module 100 of FIG. 1 and image processing pipeline 230 may receive already translated pipeline-specific labels, select the appropriate pipeline-specific labels, and perform automatic image adjustment based on the selected pipeline-specific labels. In such embodiments, it may not be necessary for image processing pipeline 230 to perform the translation. Once the generic labels have been translated to pipeline-specific labels, one or more prediction algorithms may be performed in a particular image processing pipeline 230 to perform the automatic adjustment to a new image. As described herein, generic labels, generic labels and a translation for the generic labels to the pipeline-specific labels, or already translated pipeline-specific labels may be received by image processing pipeline 230. As described herein, such receiving may occur in the form of a modular data structure.

At run-time, new image 212 may be received by any one of a number of different image processing pipelines 230 (e.g., Adobe Photoshop, Adobe Lightroom, Google Picasa, etc.). In one embodiment, new image 212 may be an image, not contained in image database 102 or 202, and a global adjustment may be made to its pixels. Note that image database 202, including raw images 204 and adjusted images 206, may be the same image database as image database 102 of FIG. 1. The global adjustment made to the pixels of new image 212 may result in adjusted new image 224. New image 212 may be taken with a different camera and lens combination than the images of image database 102 or 202 and may be of any subject matter, scene, and under any conditions or camera settings. In various embodiments, the global adjustment may be made based on pipeline-specific labels, which may be provided to the respective image processing pipeline, or which may be generated by image processing pipeline 230 based on generic labels and a translation. Global adjustment may also be based on generic algorithm parameters.

During algorithm training in supervised learning module 114, GPR may have optimized the hyper-parameters of a covariance function so that it may explain the training set. In one embodiment, when predicting adjustments to new image 212, the covariance function, which may be included as part of the generic algorithm parameters, may be used by prediction module 218 to drive the combination of a selection of some of the pipeline-specific labels. In one embodiment, the selection of pipeline-specific labels may include selecting several nearest neighbors and combining them in a weighted combination. For example, pipeline-specific labels of images 1, 14, 15, 16, 94, 104, 1603, and 2300 may be combined at weights 1%, 3%, 3%, 1%, 35%, 0.3%, 7%, and 49.7% respectively for a particular new image 212. For other new images 212, the nearest neighbors and weights may be different. In one embodiment, each pipeline-specific label may be represented for a given new image 212. For example, if a training set includes 2500 images, each of the 2500 images may be selected and combined but many of the pipeline-specific labels may be weighted by a near-zero percentage, such as 0.001% so that the nearest neighbors may be weighted more heavily and non-nearest neighbors may not be weighted heavily. In one embodiment, pipeline-specific labels with a weight below a certain threshold may be clipped to simplify and expedite computation.

Other techniques to globally adjust new image 212 may be used as well. For example, prediction module 218 may find an image (e.g., first image of an image pair) similar to new image 212 in image database 202 and apply the pipeline-specific label(s) corresponding to the image pair having the found image to new image 212. In one embodiment, when predicting an adjustment to new image 212, a full curve, or pipeline-specific label(s), may be used to globally adjust the new image, and not a simplified curve or pipeline-specific label that includes only the first PCA component. Thus, in such an embodiment, training the algorithm, as described in FIG. 1, may use just the first PCA coefficient while predicting using the trained algorithm (e.g., generic algorithm parameters) may use a full set of pipeline-specific labels. Note that, in various embodiments, supervised learning module 114 and prediction module 218 may each be configured to train the recession algorithm and predict using the trained algorithm. Moreover, as generic label generation module 100 may reside in an image processing pipeline, prediction module 218 and supervised learning module 114 may actually be the same module in some embodiments. For clarity, however, they are referred to with two different names.

In one embodiment, image processing pipeline 230 may include difference learning module 222. Difference learning module 222 may learn the difference in a new user's adjustment preferences over a reference predicted adjustment (e.g., a prediction by prediction module 218 according to the generic algorithm parameters). In one embodiment, difference learning module 222 may use only a few images that may be arbitrarily selected. Further, the few images may include images that are not included in image database 202. If the images are included in image database 202, sensor placement or other such techniques may not be needed to optimize difference learning module 222. However, in some embodiments, difference learning module 222 may use such techniques to optimize which images a new user adjusts (e.g., via user input 208). By randomly choosing pictures for training, difference learning module 222 may learn adjustment preferences on-the-fly. Given new image 212, difference learning module 222 may predict both a reference adjustment and the difference between the reference adjustment and the new user's adjustment. Thus, difference learning module 222 may apply a predictive adjustment, according to the generic algorithm parameters applied to pipeline-specific labels, followed by a predictive correction to generate adjusted new image 224. In some embodiments, the reference predictive adjustment may be determined by supervised learning module 114, and may be received as part of input 232.

In one embodiment, image processing pipeline 230 may include transferred adjustment module 220. Transferred adjustment module 220 may learn the adjustments of a new user. The new user may adjust, via user input 208, a small set of images S, for example, from image database 202. In one embodiment, S may include tens of images for a user to adjust. For example, S may include 25 images. The small set of images S that the new user adjusts may be a subset of image database 202. In one embodiment, the small set of images S may be the most useful photos of the image database 202 to learn a new user's adjustment. The small set of images S may be selected with a sensor placement technique. In one embodiment, GPR may be run on a large set L of image pairs from image database 102 to compute a covariance function $\Sigma_L$. This may be performed by prediction module 218 (or supervised learning module 114). The covariance function $\Sigma_L$ that is trained on L may be used by GPR to run an interpolation on the curves of the small set S. In one embodiment, the curves, or labels, of the small set S may be computed by GPR in the same manner the generic labels were computed for the images of large set S. Given new image 212, GPR may produce weights for the pipeline-specific labels of the small set of images S. Descriptors may be computed for new image 212 and then weighted and combined accordingly to generate adjusted new image 224. The computation and weighting may collectively be referred to, in some embodiments, as the transferred adjustment.

In one embodiment, GPR may be trained on a large training set L of images, such as image database 102 or 202. Then, reference curves for each photo of a small set of images S may be predicted. The difference between the predicted curves of S and the new user's curves for those images may be computed. The computed differences yield a series of adjustment offsets, o. Given new image 212, a reference adjustment r may be predicted using the covariance $\Sigma_L$ and the adjustments in L. Then, an adjustment offset o may be predicted using the L covariance $\Sigma_L$ and the offsets computed on S. The adjustment offset o may be added to the reference adjustment r such that for new image 212, a combined adjustment r+o may be applied to new image 212 resulting in adjusted new image 224.

By using generic labels and adapting the generic labels to a number of image processing pipelines, just one training set of images may be used to train the algorithm without having to generate a different training set for each combination of color space and imaging pipeline. As such, the algorithm may not need to be trained separately for each image processing pipeline. Moreover, using generic labels in supervised learning to predict image adjustments may predict adjustments to new images better than image adjustment techniques that rely on a set of rules, (e.g., if the right side of the image is dark, make it brighter) or only on unsupervised learning (only using the adjusted images and not the pre-adjusted images). The disclosed techniques may analyze adjustments that a photographer or user has made and predict adjustments to new images based on that analysis.

Figure 3:
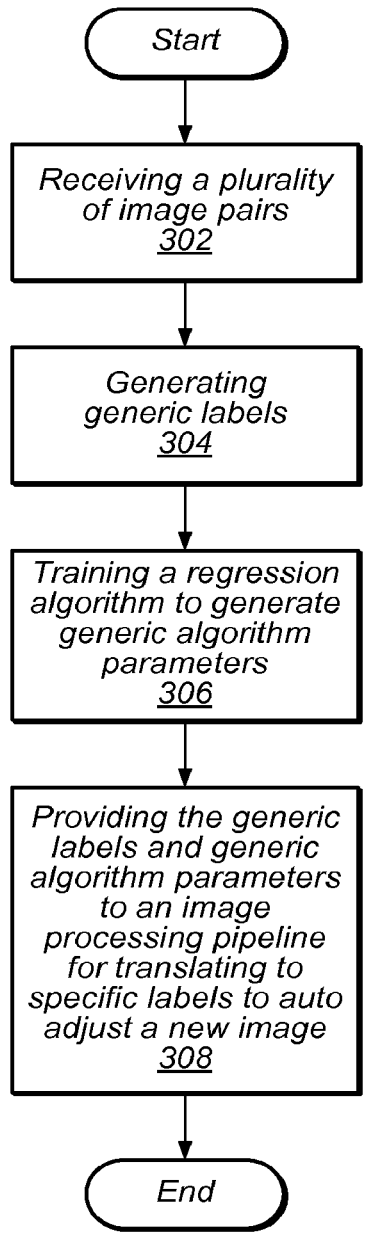
FIG. 3 illustrates a flowchart of an example method for generating generic labels that may be used for automatically adapting to an image processing pipeline, according to some embodiments.

Turning now to FIG. 3, one embodiment of generating generic labels is shown. In one embodiment, generic label generation module 100 may perform the method of FIG. 3. While the blocks are shown in a particular order for ease of understanding, other orders may be used. In some embodiments, the method of FIG. 3 may include additional (or fewer) blocks than shown.

At 302, generic label generation module 100 may receive a plurality of image pairs. In one embodiment, image pairs may include a first image (e.g., raw image 104, standard image) and a corresponding adjusted image 106. Adjusted image 106 is said to correspond to the first image because it is an adjusted version of the first image. Generic label generation module 100 may receive, in one embodiment, 5000 image pairs. In other embodiments, additional or fewer than 5000 image pairs may be received. In some embodiments, generic label generation module 100 may receive additional sets of adjusted images 106 that correspond to raw images 104 (e.g., for each raw image, multiple adjusted images may be received).

At 304, generic label generation module 100 may generate a plurality of generic (e.g., not specific to any one particular pipeline) labels. Each of the plurality of generic labels may relate one or more parameters of a first image (e.g., raw image 104) to a corresponding adjusted image 106 of an image pair. In some embodiments, the generic labels may represent a global tonal adjustment. The plurality of generic labels may be based upon tonal parameters such as black points, highlights, shadows, contrast, brightness and exposure, among other possibilities. The generic labels may be described in terms of features such as intensity distributions, scene brightness, equalization curves, detail-weighted equalization curves, highlight clipping, spatial distributions, and faces. Generating the generic labels may include taking the image pairs, decomposing them, and performing PCA.

At 306, a regression algorithm may be trained with the plurality of generic labels resulting in a plurality of generic algorithm parameter. In one embodiment, a regression algorithm, for example, a GPR algorithm, may be used to compute generic algorithm parameters for each image pair by analyzing descriptor vectors, given by the described features/generic labels. Each generic algorithm parameter may be represented with a first PCA coefficient. The plurality of generic algorithm parameters may be seen as hyper-parameters of a covariance function that may explain the training set image pairs. In various embodiments, the generated generic labels from block 304 and the generic algorithm parameters from block 306 may be used in the method of FIG. 4.

In some embodiments, the generic labels and generic algorithm parameters may be stored in a data structure along with a translation for each of a number of image processing pipelines. The data structure may be modular and may include generic learning parameters stored at different degrees of fidelity.

At 308, the generic labels and/or generic parameters may be configured to be provided to an image processing pipeline. For example, a data structure that includes the generic labels, generic parameters, and translations may be provided to an image processing pipeline. The image processing pipeline may be configured to translate the generic labels into pipeline-specific labels and may further be configured to automatically adjust a new image 212 based on the pipeline-specific labels and generic algorithm parameters. In various embodiments, generic labels and a translation table may be provided to an image processing pipeline 230. In other embodiments, generic labels may be translated into pipeline-specific labels, which may then be provided to image processing pipeline 230. The pipeline-specific labels and the generic algorithm parameters may be used to automatically globally adjust a new image.

In various embodiments, the generic labels, generic algorithm parameters, and translations may be provided to various different image processing pipelines. Each different image processing pipeline may use the respective translation corresponding to that particular image processing pipeline to translate the generic labels to pipeline-specific labels. Thus, the generic labels and generic algorithm parameters may be used with a variety of image processing pipelines for which a translation is provided.

Figure 4:
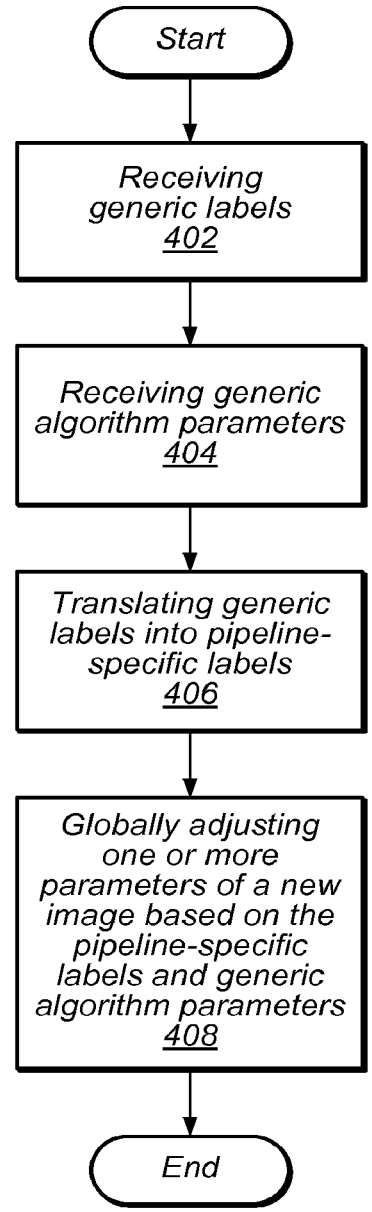
FIG. 4 illustrates a flowchart of an example method for automatically adapting generic labels to a specific image processing pipeline, according to some embodiments.

Turning now to FIG. 4, one embodiment of a method for globally adjusting an image by using automatically adapted pipeline-specific labels is shown. In one embodiment, image processing pipeline 230 may perform the method of FIG. 4 while, in other embodiments, another module may perform some or all blocks of the method of FIG. 4. While the blocks are shown in a particular order for ease of understanding, other orders may be used. In some embodiments, the method of FIG. 4 may include additional (or fewer) blocks than shown.

As shown at 402, a plurality of generic labels may be received. Generic labels may relate one or more parameters of a first image (e.g., raw image, standard image, etc.) to a corresponding adjusted image of an image pair for each of a plurality of image pairs. Generic labels may include values, parameters, tone curves, color transformations, other transformations, etc. that are not specific to any one particular image processing pipeline. A generic label may be a set of numbers that may be used to map to another set of numbers in a specific image processing pipeline 230. In one embodiment, the generic labels may be generated as described at block 304.

As illustrated at 404, a plurality of generic algorithm parameters may be received. The plurality of generic algorithm parameters may be generated by a training a regression algorithm with the plurality of generic labels. The generic labels and generic algorithm parameters may be received in a single data structure, in some embodiments. The data structure may also include a number of translations that correspond to various supported image processing pipelines.

As shown at 406, the generic labels may be translated into pipeline-specific labels. Translation may be performed by using one of the translations (e.g., a table, a matrix, etc.) in conjunction with the generic labels. In some embodiments, a generic label may not have a one to one correspondence with a pipeline-specific label. For instance, one or more of the generic labels and one or more corresponding pipeline-specific labels may be multi-dimensional. As one example, a generic label may be a value represented by three different generic sliders whereas in one specific pipeline, the pipeline-specific label may be represented by four different pipeline-specific sliders. In such an example, the generic label may be of a different dimensionality than the corresponding pipeline-specific label. Translating may be a mapping of the multiple dimensions of the one or more generic labels to the multiple dimensions of the corresponding one or more pipeline-specific labels.

At 408, one or more parameters of a new image may be globally adjusted based on the pipeline-specific labels. New image 212 may be an image not contained in image database 102. New image 212 may be taken with a different camera and lens combination than those images of image database 102 and may be of any subject matter, scene, and under any conditions or camera settings. In one embodiment, globally adjusting one or more parameters of new image 212 may result in adjusted new image 224. In one embodiment, the trained regression algorithm, for example, GPR may use the generic algorithm parameters (e.g., the covariance function) computed in block 304 to drive a combination of training curves to optimize adjustment of a new image. The pipeline-specific labels may be combined in a weighted manner. In one embodiment, the selection of pipeline-specific labels may include selecting several nearest neighbors and combining them in a weighted combination. Further, the pipeline-specific labels used to globally adjust one or more parameters of new image 212 may include the fully array of PCA coefficients, and not just the first coefficient. The composite weighted training pipeline-specific labels may be applied globally to the luminance of an input pixel to determine the luminance of an output pixel. In some embodiments, performing block 406 may result in adjusted new image 224.

In one embodiment, globally adjusting the new image may include determining the first image most similar to the new image and applying the pipeline-specific labels corresponding to the image pair that includes the first image to the new image. In one embodiment, globally adjusting the new image may include performing a weighted combination of the plurality of pipeline-specific labels based on the generic algorithm parameters. The weighted combination may then be applied to the new image resulting in an adjusted new image.

Example System

Figure 6:
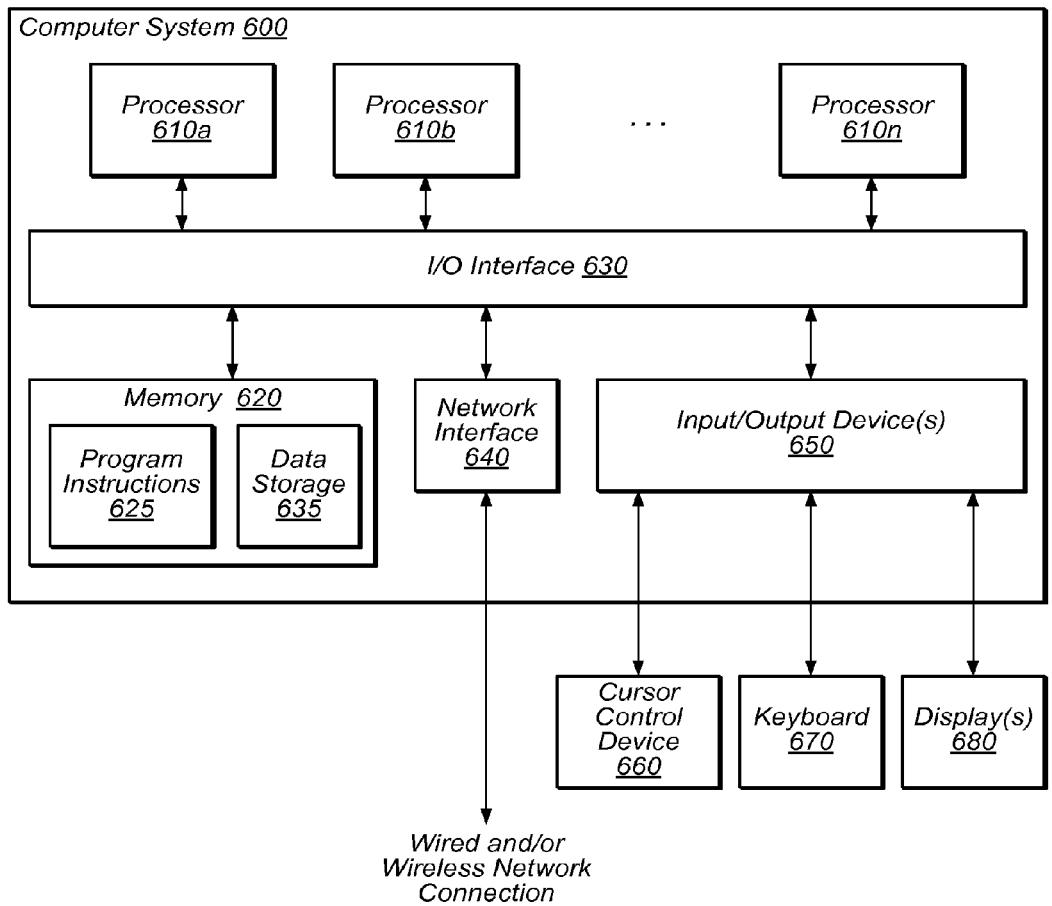
FIG. 6 illustrates an example computer system that may be used in embodiments.

Embodiments of generic label generation, pipeline-specific label adaptation, and automatic image adjustment techniques may be executed on one or more computer systems, which may interact with various other devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement embodiments as described herein, and data storage 635, comprising various data accessible by program instructions 625. In one embodiment, program instructions 625 may include software elements of embodiments as illustrated in the above Figures. Data storage 635 may include data that may be used in embodiments. In other embodiments, other or different software elements and data may be included.

Those skilled in the art will appreciate that computer system 600 is merely illustrative and is not intended to limit the scope of a generic label generation module or image processing pipeline, as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method comprising:
    generating a plurality of generic labels by a computing device for a plurality of image pairs in which:
        each of the image pairs includes a first image and a corresponding adjusted image that is an adjusted version of the first image; and
        each generic label relates one or more parameters of one of the first images of one of the image pairs to one or more parameters of the corresponding adjusted image of the one image pair; and
    generating a plurality of generic algorithm parameters by the computing device using the plurality of generic labels, the plurality of generic algorithm parameters configured to be used by an image processing pipeline to translate the generic labels into pipeline-specific labels to be used to automatically adjust a new image in which the generic labels, the generic algorithm parameters, a translation to the image processing pipeline, and a translation to a different image processing pipeline are configured to be provided to the image processing pipeline and the different image processing pipeline, each of the image processing pipeline and the different image processing pipeline configured to translate the generic labels into pipeline-specific labels based on the respective translation.

2. A method of claim 1, wherein the generating of the plurality of generic algorithm parameters involves use of one or more regression algorithms.

3. A method of claim 1, further comprising storing the generic algorithm parameters at different degrees of fidelity.

4. A method of claim 1, wherein at least one of the pipeline-specific labels of the image processing pipeline are different than a corresponding translated one of the pipeline-specific labels of the different image processing pipeline.

5. A method of claim 1, wherein the generating of the plurality of generic labels includes performing principal component analysis on the plurality of image pairs.

6. A method of claim 1, wherein the image processing pipeline is further configured to automatically adjust the new image based on the pipeline-specific labels and the generic algorithm parameters.

7. A method of claim 1, wherein the generic labels represent a global tonal adjustment.

8. A computing device comprising one or more modules implemented at least in partly by hardware and configured to perform operations comprising:

generating a plurality of generic labels for a plurality of image pairs in which:
- each of the image pairs includes a first image and a corresponding adjusted image that is an adjusted version of the first image; and
- each generic label relates one or more parameters of one of the first images of one of the image pairs to one or more parameters of the corresponding adjusted image of the one image pair; and generating a plurality of generic algorithm parameters using the plurality of generic labels, the plurality of generic algorithm parameters configured to be used by an image processing pipeline to translate the generic labels into pipeline-specific labels to be used to automatically adjust a new image in which the generic labels, the generic algorithm parameters, a translation to the image processing pipeline, and a translation to a different image processing pipeline are configured to be provided to the image processing pipeline and the different image processing pipeline, each of the image processing pipeline and the different image processing pipeline configured to translate the generic labels into pipeline-specific labels based on the respective translation.

9. A computing device of claim 8, wherein the generating of the plurality of generic algorithm parameters involves use of one or more regression algorithms.

10. A computing device of claim 8, wherein the one or more modules are further configured to store the generic algorithm parameters at different degrees of fidelity.

11. A computing device of claim 8, wherein at least one of the pipeline-specific labels of the image processing pipeline are different than a corresponding translated one of the pipeline-specific labels of the different image processing pipeline.

12. A computing device of claim 8, wherein the generating of the plurality of generic labels includes performing principal component analysis on the plurality of image pairs.

13. A computing device of claim 8, wherein the image processing pipeline is further configured to automatically adjust the new image based on the pipeline-specific labels and the generic algorithm parameters.

14. A computing device of claim 8, wherein the generic labels represent a global tonal adjustment.

15. One or more computer-readable storage media that are non-transitory and comprising instructions that are stored thereon that, responsive to execution by a computing device, cause the computing device to perform operations comprising:

generating a plurality of generic labels for a plurality of image pairs in which:
- each of the image pairs includes a first image and a corresponding adjusted image that is an adjusted version of the first image; and
- each generic label relates one or more parameters of one of the first images of one of the image pairs to one or more parameters of the corresponding adjusted image of the one image pair; and generating a plurality of generic algorithm parameters using the plurality of generic labels, the plurality of generic algorithm parameters configured to be used by an image processing pipeline to translate the generic labels into pipeline-specific labels to be used to automatically adjust a new image in which the generic labels, the generic algorithm parameters, a translation to the image processing pipeline, and a translation to a different image processing pipeline are configured to be provided to the image processing pipeline and the different image processing pipeline, each of the image processing pipeline and the different image processing pipeline configured to translate the generic labels into pipeline-specific labels based on the respective translation.

16. One or more computer-readable storage media as described in claim 15, wherein the generating of the plurality of generic algorithm parameters involves use of one or more regression algorithms.

17. One or more computer-readable storage media as described in claim 15, further comprising storing the generic algorithm parameters at different degrees of fidelity.

18. One or more computer-readable storage media as described in claim 15, wherein at least one of the pipeline-specific labels of the image processing pipeline are different than a corresponding translated one of the pipeline-specific labels of the different image processing pipeline.

19. One or more computer-readable storage media as described in claim 15, wherein the generating of the plurality of generic labels includes performing principal component analysis on the plurality of image pairs.

20. One or more computer-readable storage media as described in claim 15, wherein the image processing pipeline is further configured to automatically adjust the new image based on the pipeline-specific labels and the generic algorithm parameters.

* * * * *